US009654260B2

United States Patent
Seo

(10) Patent No.: US 9,654,260 B2
(45) Date of Patent: May 16, 2017

(54) METHOD FOR SETTING START SYMBOL OF DOWNLINK CHANNEL IN WIRELESS COMMUNICATION SYSTEM AND APPARATUS FOR SAME

(71) Applicant: LG ELECTRONICS INC., Seoul (KR)

(72) Inventor: Hanbyul Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/383,402

(22) PCT Filed: Mar. 5, 2013

(86) PCT No.: PCT/KR2013/001768
§ 371 (c)(1),
(2) Date: Sep. 5, 2014

(87) PCT Pub. No.: WO2013/137582
PCT Pub. Date: Sep. 19, 2013

(65) Prior Publication Data
US 2015/0043468 A1 Feb. 12, 2015

Related U.S. Application Data

(60) Provisional application No. 61/611,558, filed on Mar. 15, 2012, provisional application No. 61/701,716, (Continued)

(51) Int. Cl.
*H04W 72/08* (2009.01)
*H04J 11/00* (2006.01)
(Continued)

(52) U.S. Cl.
CPC .......... *H04L 5/003* (2013.01); *H04L 5/0048* (2013.01); *H04L 5/0053* (2013.01); (Continued)

(58) Field of Classification Search
CPC ....... H04L 5/003; H04L 5/001; H04L 5/0048; H04L 5/0053; H04L 5/0035; H04L 5/0078; H04W 72/08; H04W 8/00
(Continued)

(56) References Cited

U.S. PATENT DOCUMENTS 8,606,286 B2 * 12/2013 Vrzic ................... H04L 1/0046
370/329
2009/0181692 A1 * 7/2009 Gaal et al. ................. 455/452.2
(Continued)

FOREIGN PATENT DOCUMENTS

WO WO 2011/074868 A2 6/2011
WO WO 2011/085192 A1 7/2011

*Primary Examiner* — Edan Orgad
*Assistant Examiner* — Vanneilian Lalchinthang
(74) *Attorney, Agent, or Firm* — Birch, Stewart, Kolasch & Birch, LLP

(57) ABSTRACT

The present invention discloses a method for a terminal receiving a downlink signal on a predetermined subframe in a wireless communication system. More specifically, the method comprises the steps of: receiving an enhanced physical downlink control channel (EPDCCH) from a base station; and receiving a physical downlink shared channel (PDSCH) from the base station, on the basis of the EPDCCH, wherein the EPDCCH is assumed not to be mapped onto a resource block (RB) of a symbol for receiving a physical control format indicator channel (PCFICH) or a physical hybrid-ARQ indicator channel (PHICH), when the PCFICH or the PHICH is received by the predetermined subframe.

11 Claims, 13 Drawing Sheets

Related U.S. Application Data filed on Sep. 16, 2012, provisional application No. 61/723,292, filed on Nov. 6, 2012.

(51) Int. Cl.
*H04W 8/00* (2009.01)
*H04L 5/00* (2006.01)

(52) U.S. Cl.
CPC .......... *H04L 5/0078* (2013.01); *H04L 5/001* (2013.01); *H04L 5/0035* (2013.01)

(58) Field of Classification Search
USPC ........................................... 370/329
See application file for complete search history.

(56) References Cited

U.S. PATENT DOCUMENTS

| | | | |
|---|---|---|---|
| 2010/0265870 A1* | 10/2010 | Cai et al. | 370/312 |
| 2010/0322180 A1* | 12/2010 | Kim et al. | 370/329 |
| 2011/0064037 A1* | 3/2011 | Wei | H04L 5/0035 370/329 |
| 2011/0075624 A1* | 3/2011 | Papasakellariou | H04L 5/0053 370/329 |
| 2011/0170496 A1* | 7/2011 | Fong | H04L 5/0053 370/329 |
| 2012/0218952 A1* | 8/2012 | Kwon | H04L 5/001 370/329 |

* cited by examiner (a) CONTROL-PLANE PROTOCOL STACK (b) USER-PLANE PROTOCOL STACK (a) 1TX OR 2TX (b) 4 TX

METHOD FOR SETTING START SYMBOL OF DOWNLINK CHANNEL IN WIRELESS COMMUNICATION SYSTEM AND APPARATUS FOR SAME

CROSS REFERENCE TO RELATED APPLICATIONS

This application is the National Phase of PCT/KR2013/001768 filed on Mar. 5, 2013, which claims priority under 35 U.S.C. 119(e) to U.S. Provisional Application No. 61/611,558 filed on Mar. 15, 2012, to U.S. Provisional Application No. 61/701,716 filed on Sep. 16, 2012 and to U.S. Provisional Application No. 61/723,292 filed on Nov. 6, 2012, all of which are hereby expressly incorporated by reference herein in its entirety.

TECHNICAL FIELD

The present invention relates to a wireless communication system and, more particularly, to a method for a setting a start symbol of a downlink channel in a wireless communication system and an apparatus for the same.

BACKGROUND ART

As an example of a wireless communication system to which the present invention is applicable, a $3^{rd}$ Generation Partnership Project (3GPP) Long Term Evolution (LTE) communication system will be schematically described.

FIG. 1 is a diagram showing a network structure of an Evolved Universal Mobile Telecommunications System (E-UMTS) as a wireless communication system. The E-UMTS is an evolved form of the UMTS and has been standardized in the 3GPP. Generally, the E-UMTS may be called a Long Term Evolution (LTE) system. For details of the technical specifications of the UMTS and E-UMTS, refer to Release 7 and Release 8 of "$3^{rd}$ Generation Partnership Project; Technical Specification Group Radio Access Network".

Referring to FIG. 1, the E-UMTS mainly includes a User Equipment (UE), base stations (or eNBs or eNode Bs), and an Access Gateway (AG) which is located at an end of a network (E-UTRAN) and which is connected to an external network. Generally, an eNB can simultaneously transmit multiple data streams for a broadcast service, a multicast service and/or a unicast service.

One or more cells may exist per eNB. The cell is set to use a bandwidth such as 1.44, 3, 5, 10, 15 or 20 MHz to provide a downlink or uplink transmission service to several UEs. Different cells may be set to provide different bandwidths. The eNB controls data transmission or reception of a plurality of UEs. The eNB transmits downlink (DL) scheduling information of DL data so as to inform a corresponding UE of time/frequency domain in which data is transmitted, coding, data size, and Hybrid Automatic Repeat and reQest (HARQ)-related information. In addition, the eNB transmits uplink (UL) scheduling information of UL data to a corresponding UE so as to inform the UE of a time/frequency domain which may be used by the UE, coding, data size and HARQ-related information. An interface for transmitting user traffic or control traffic can be used between eNBs. A Core Network (CN) may include an AG, a network node for user registration of the UE, etc. The AG manages mobility of a UE on a Tracking Area (TA) basis. One TA includes a plurality of cells.

Although wireless communication technology has been developed up to Long Term Evolution (LTE) based on Wideband Code Division Multiple Access (WCDMA), the demands and the expectations of users and providers continue to increase. In addition, since other radio access technologies have been continuously developed, new technology evolution is required to secure high competitiveness in the future. Decrease in cost per bit, increase in service availability, flexible use of a frequency band, simple structure, open interface, suitable User Equipment (UE) power consumption and the like are required.

DISCLOSURE

Technical Problem

An object of the present invention devised to solve the problem lies in a method for a setting a start symbol of a downlink channel in a wireless communication system and an apparatus for the same.

Technical Solution

The object of the present invention can be achieved by providing a method for receiving a downlink signal on a predetermined subframe at a user equipment (UE) in a wireless communication system including receiving an enhanced physical downlink control channel (EPDCCH) from a base station and receiving a physical downlink shared channel (PDSCH) from the base station based on the EPDCCH, wherein, if a physical control format indicator channel (PCFICH) or a physical hybrid-ARQ indicator channel (PHICH) is received on the predetermined subframe, the EPDCCH is assumed not to be mapped to a resource block (RB) of a symbol for receiving the PCFICH or the PHICH.

The EPDCCH may be assumed not to be mapped to one or more other RBs of a symbol for receiving the PCFICH or the PHICH.

The method may further include receiving information about a subframe, on which the PCFICH or the PHICH is transmitted, via a higher layer. In this case, if the predetermined subframe is a subframe on which the PCFICH or the PHICH is not transmitted, the EPDCCH or the PDSCH may be mapped to symbols starting from a first symbol of the predetermined subframe. The method may further include receiving information about whether a cell-specific reference signal of a predetermined subframe is transmitted via the higher layer if the predetermined subframe is a subframe on which the PCFICH or the PHICH is not transmitted.

The EPDCCH may include information about a start symbol of the PDSCH. If a first start symbol of the PDSCH indicated by the EPDCCH and a second start symbol indicated by the PCFICH are different, the PDSCH may be assumed to be received starting from the first start symbol. Alternatively, the PDSCH may be assumed to be received starting from the second start symbol. Alternatively, the PDSCH may be deleted from a buffer.

In another aspect of the present invention, provided herein is a user equipment (UE) apparatus in a wireless communication system including a wireless communication module configured to transmit and receive a signal to and from a base station and a processor configured to process the signal, wherein the wireless communication module receives an enhanced physical downlink control channel (EPDCCH) and a physical downlink shared channel (PDSCH scheduled by the EPDCCH on a predetermined subframe from the base station, and wherein, if a physical control format indicator channel (PCFICH) or a physical hybrid-ARQ indicator channel (PHICH) is received on the predetermined subframe, the processor assumes that the EPDCCH is not mapped to a resource block (RB) of a symbol for receiving the PCFICH or the PHICH.

The processor may assume that the EPDCCH is not mapped to one or more other RBs of a symbol for receiving the PCFICH or the PHICH.

The processor may assume that the EPDCCH or the PDSCH is mapped to symbols starting from a first symbol of the predetermined subframe, if the predetermined subframe is a subframe on which the PCFICH or the PHICH is not transmitted.

If a first start symbol of the PDSCH indicated by the EPDCCH and a second start symbol indicated by the PCFICH are different, the processor may assume that the PDSCH is received starting from the first start symbol. Alternatively, the processor may assume that the PDSCH is received starting from the second start symbol. Alternatively, the PDSCH may be deleted from a buffer.

Advantageous Effects

According to embodiments of the present invention, it is possible to efficiently set a start symbol of a downlink control channel in a wireless communication system.

It will be appreciated by persons skilled in the art that that the effects that can be achieved through the present invention are not limited to what has been particularly described hereinabove and other advantages of the present invention will be more clearly understood from the following detailed description.

BEST MODE

The configuration, operation and other features of the present invention will be understood by the embodiments of the present invention described with reference to the accompanying drawings. The following embodiments are examples of applying the technical features of the present invention to a $3^{rd}$ Generation Partnership Project (3GPP) system.

Although, for convenience, the embodiments of the present invention are described using the LTE system and the LTE-A system in the present specification, the embodiments of the present invention are applicable to any communication system corresponding to the above definition. In addition, although the embodiments of the present invention are described based on a Frequency Division Duplex (FDD) scheme in the present specification, the embodiments of the present invention may be easily modified and applied to a Half-Duplex FDD (H-FDD) scheme or a Time Division Duplex (TDD) scheme.

Figure 1:
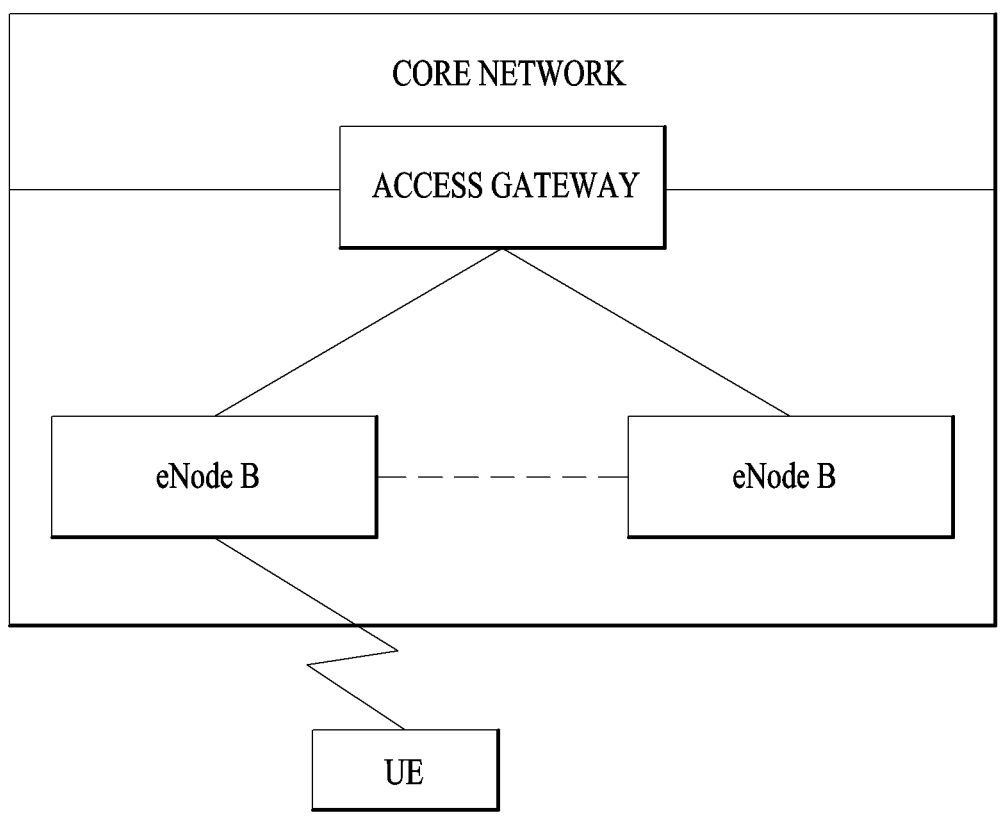
FIG. 1 is a diagram showing a network structure of an Evolved Universal Mobile Telecommunications System (E-UMTS) as an example of a wireless communication system.
Figure 2:
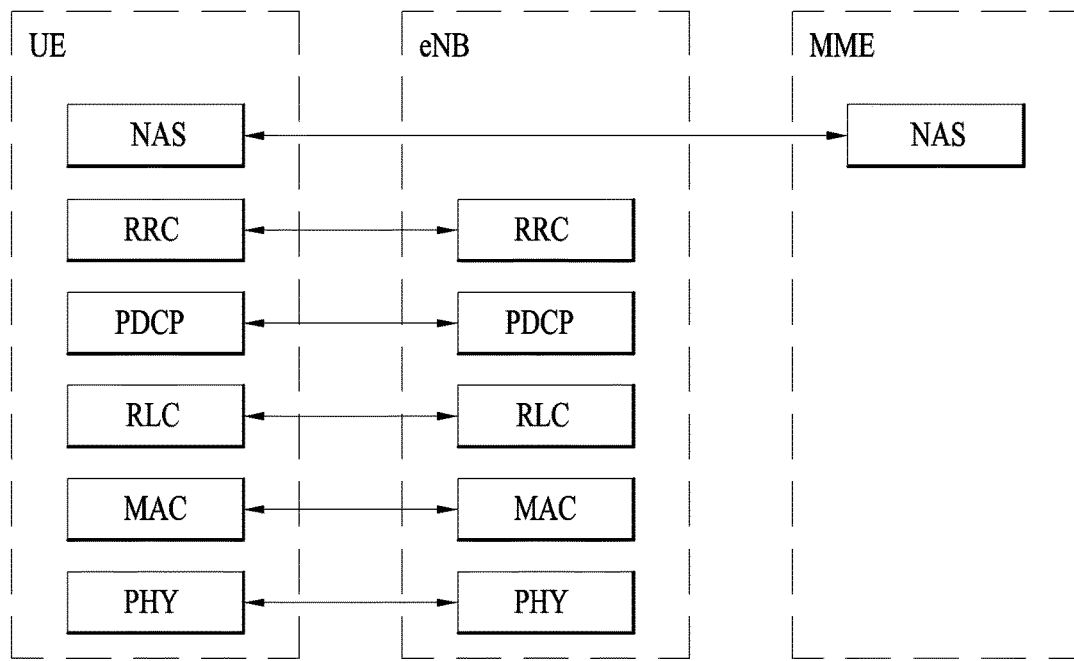
FIG. 2 is a diagram showing a control plane and a user plane of a radio interface protocol architecture between a User Equipment (UE) and an Evolved Universal Terrestrial Radio Access Network (E-UTRAN) based on a $3^{rd}$ Generation Partnership Project (3GPP) radio access network standard.
Figure 2:
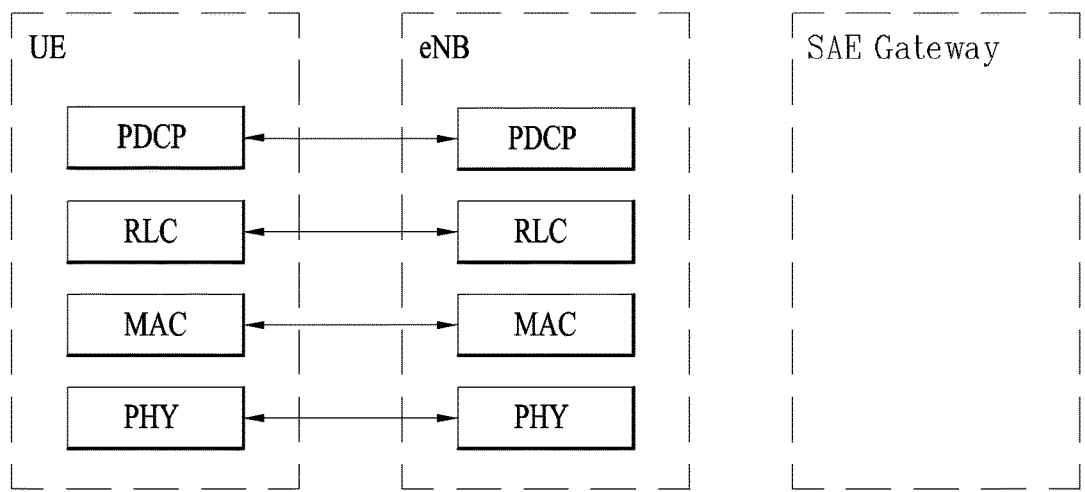

FIG. 2 shows a control plane and a user plane of a radio interface protocol between a UE and an Evolved Universal Terrestrial Radio Access Network (E-UTRAN) based on a 3GPP radio access network standard. The control plane refers to a path used for transmitting control messages used for managing a call between the UE and the network. The user plane refers to a path used for transmitting data generated in an application layer, e.g., voice data or Internet packet data.

A physical (PHY) layer of a first layer provides an information transfer service to a higher layer using a physical channel. The PHY layer is connected to a Medium Access Control (MAC) layer located on a higher layer via a transport channel. Data is transported between the MAC layer and the PHY layer via the transport channel. Data is also transported between a physical layer of a transmitting side and a physical layer of a receiving side via a physical channel. The physical channel uses a time and a frequency as radio resources. More specifically, the physical channel is modulated using an Orthogonal Frequency Division Multiple Access (OFDMA) scheme in downlink and is modulated using a Single-Carrier Frequency Division Multiple Access (SC-FDMA) scheme in uplink.

A Medium Access Control (MAC) layer of a second layer provides a service to a Radio Link Control (RLC) layer of a higher layer via a logical channel. The RLC layer of the second layer supports reliable data transmission. The function of the RLC layer may be implemented by a functional block within the MAC. A Packet Data Convergence Protocol (PDCP) layer of the second layer performs a header compression function to reduce unnecessary control information for efficient transmission of an Internet Protocol (IP) packet such as an IPv4 packet or an IPv6 packet in a radio interface having a relatively small bandwidth.

A Radio Resource Control (RRC) layer located at the bottom of a third layer is defined only in the control plane and is responsible for control of logical, transport, and physical channels in association with configuration, reconfiguration, and release of Radio Bearers (RBs). The RB is a service that the second layer provides for data communication between the UE and the network. To accomplish this, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A Non-Access Stratum (NAS) layer located above the RRC layer performs functions such as session management and mobility management.

One cell of the eNB is set to use a bandwidth such as 1.4, 3, 5, 10, 15 or 20 MHz to provide a downlink or uplink transmission service to UEs. Different cells may be set to provide different bandwidths.

Downlink transport channels for transmission of data from the network to the UE include a Broadcast Channel (BCH) for transmission of system information, a Paging Channel (PCH) for transmission of paging messages, and a downlink Shared Channel (SCH) for transmission of user traffic or control messages. Traffic or control messages of a downlink multicast or broadcast service may be transmitted through a downlink SCH and may also be transmitted through a downlink multicast channel (MCH). Uplink transport channels for transmission of data from the UE to the network include a Random Access Channel (RACH) for transmission of initial control messages and an uplink SCH for transmission of user traffic or control messages. Logical channels, which are located above the transport channels and are mapped to the transport channels, include a Broadcast Control Channel (BCCH), a Paging Control Channel (PCCH), a Common Control Channel (CCCH), a Multicast Control Channel (MCCH), and a Multicast Traffic Channel (MTCH).

Figure 3:
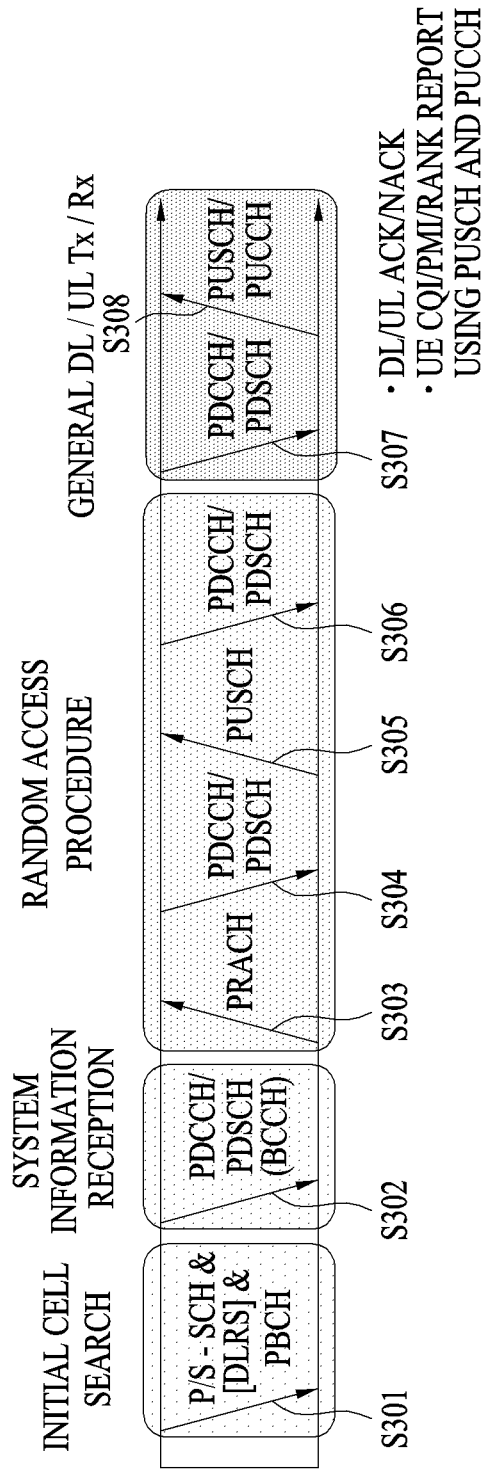
FIG. 3 is a diagram showing physical channels used in a 3GPP system and a general signal transmission method using the same.

FIG. 3 is a diagram showing physical channels used in a 3GPP system and a general signal transmission method using the same.

A UE performs an initial cell search operation such as synchronization with an eNB when power is turned on or the UE enters a new cell (S301). The UE may receive a Primary Synchronization Channel (P-SCH) and a Secondary Synchronization Channel (S-SCH) from the eNB, perform synchronization with the eNB, and acquire information such as a cell ID. Thereafter, the UE may receive a physical broadcast channel from the eNB so as to acquire broadcast information within the cell. Meanwhile, the UE may receive a Downlink Reference Signal (DL RS) so as to confirm a downlink channel state in the initial cell search step.

The UE, which has completed the initial cell search, may receive a Physical Downlink Control Channel (PDCCH) and a Physical Downlink Shared Channel (PDSCH) according to information included in the PDCCH so as to acquire more detailed system information (S302).

Meanwhile, if the eNB is initially accessed or radio resources for signal transmission are not present, the UE may perform a Random Access Procedure (RACH) (step S303 to S306) with respect to the eNB. In this case, the UE may transmit a specific sequence through a Physical Random Access Channel (PRACH) as a preamble (S303 and S305), and receive a response message of the preamble through the PDCCH and the PDSCH corresponding thereto (S304 and S306). In the case of contention-based RACH, a contention resolution procedure may be further performed.

The UE, which has performed the above procedures, may perform PDCCH/PDSCH reception (S307) and Physical Uplink Shared Channel PUSCH)/Physical Uplink Control Channel (PUCCH) transmission (S308) as a general uplink/downlink signal transmission procedure. In particular, the UE receives downlink control information (DCI) through a PDCCH. Here, the DCI includes control information such as resource allocation information of the UE and the format thereof differs according to the use purpose.

The control information transmitted from the UE to the eNB in uplink or transmitted from the eNB to the UE in downlink includes a downlink/uplink ACK/NACK signal, a Channel Quality Indicator (CQI), a Precoding Matrix Index (PMI), a Rank Indicator (RI), and the like. In the case of the 3GPP LTE system, the UE may transmit the control information such as CQI/PMI/RI through the PUSCH and/or the PUCCH.

Figure 4:
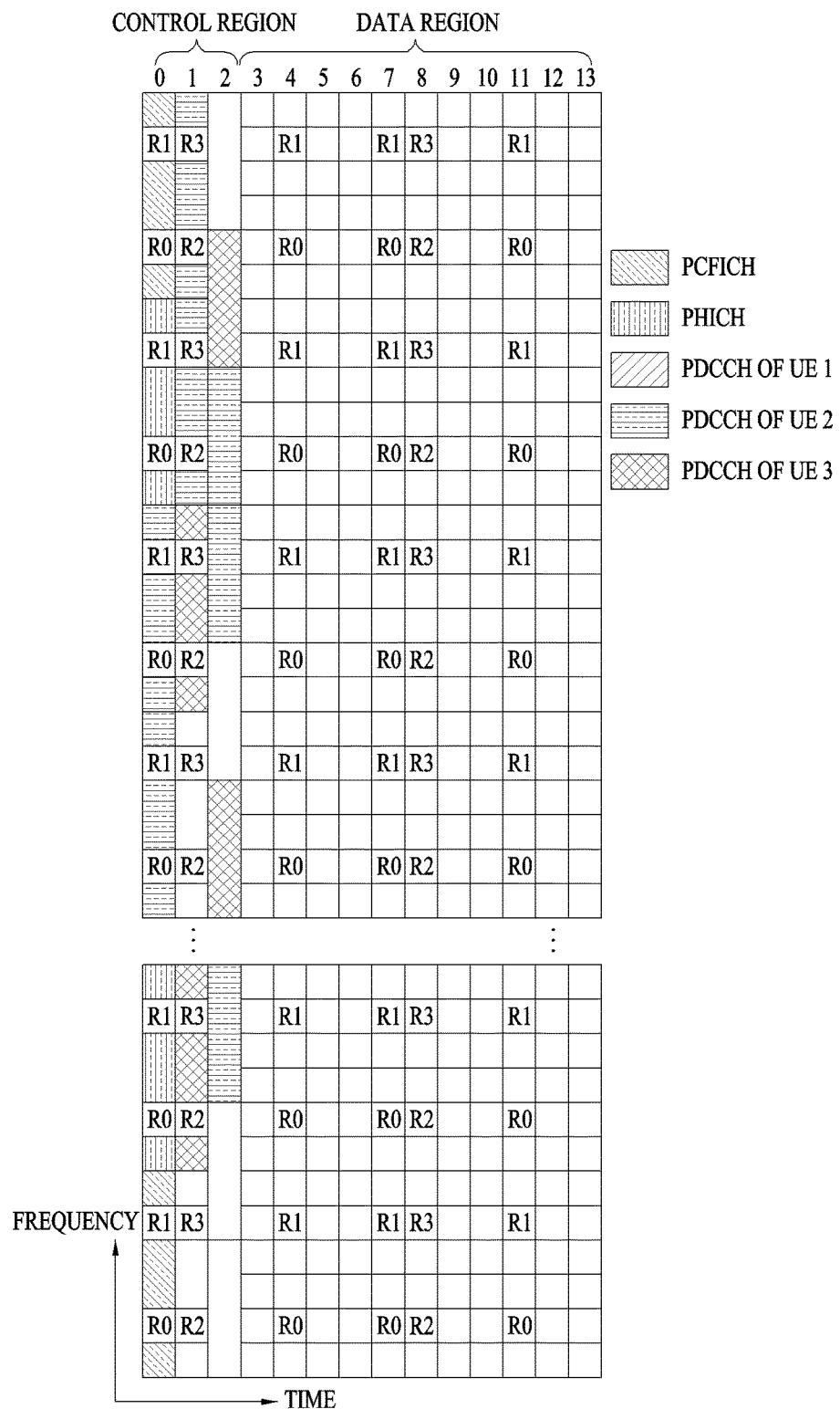
FIG. 4 is a diagram showing the structure of a downlink radio frame used in an LTE system.

FIG. 4 is a diagram showing a control channel included in a control region of one subframe in a downlink radio frame.

Referring to FIG. 4, a subframe includes 14 OFDM symbols. The first to third OFDM symbols are used as a control region and the remaining 13 to 11 OFDM symbols are used as a data region, according to subframe configuration. In FIG. 4, R1 to R4 denote reference signals (RS) or pilot signals for antennas 0 to 3. The RS is fixed to a constant pattern within a subframe regardless of the control region and the data region. A control channel is allocated to resources, to which the RS is not allocated, in the control region, and a traffic channel is also allocated to resources, to which the RS is not allocated, in the control region. Examples of the control channel allocated to the control region include a Physical Control Format Indicator Channel (PCFICH), a Physical Hybrid-ARQ Indicator Channel (PHICH), a Physical Downlink Control Channel (PDCCH), etc.

The Physical Control Format Indicator Channel (PCFICH) informs the UE of the number of OFDM symbols used for the PDCCH per subframe. The PCFICH is located at a first OFDM symbol and is configured prior to the PHICH and the PDCCH. The PCFICH includes four Resource Element Groups (REGs) and the REGs are dispersed in the control region based on a cell identity (ID). One REG includes four resource elements (REs). The RE indicates minimum physical resource defined as one sub-carrier×one OFDM symbol. The PCFICH has a value of 1 to 3 or 2 to 4 according to bandwidth and is modulated using a Quadrature Phase Shift Keying (QPSK) scheme.

The Physical Hybrid-ARQ Indicator Channel (PHICH) is used to carry HARQ ACK/NACK for uplink transmission. That is, the PHICH refers to a channel via which DL ACK/NACK information for uplink HARQ is transmitted. The PHICH includes one REG and is scrambled on a cell-specific basis. ACK/NACK is indicated by one bit and is modulated using a binary phase shift keying (BPSK) scheme. The modulated ACK/NACK is repeatedly spread with a spreading factor (SF) of 2 or 4. A plurality of PHICHs mapped to the same resources configures a PHICH group. The number of PHICHs multiplexed in the PHICH group is determined according to the number of spreading codes. The PHICH (group) is repeated three times in order to obtain diversity gain in a frequency region and/or time region.

The Physical Downlink Control Channel (PDCCH) is allocated to the first n OFDM symbols of a subframe. Here, n is an integer of 1 or more and is indicated by a PCFICH. The PDCCH includes one or more Control Channel Elements (CCEs). The PDCCH informs each UE or a UE group of information associated with resource allocation of a Paging Channel (PCH) and a Downlink-Shared Channel (DL-SCH), both of which are transport channels, uplink scheduling grant, HARQ information, etc. The paging channel (PCH) and the downlink-shared channel (DL-SCH) are transmitted through a PDSCH. Accordingly, the eNB and the UE transmit and receive data through the PDSCH except for specific control information or specific service data.

Information indicating to which UE (one or a plurality of UEs) data of the PDSCH is transmitted and information indicating how the UEs receive and decode the PDSCH data are transmitted in a state of being included in the PDCCH. For example, it is assumed that a specific PDCCH is CRC-masked with a Radio Network Temporary Identity (RNTI) "A", and information about data transmitted using radio resource (e.g., frequency location) "B" and transmission format information (e.g., transmission block size, modulation scheme, coding information, or the like) "C" is transmitted via a specific subframe. In this case, one or more UEs located within a cell monitor a PDCCH using its own RNTI information, and if one or more UEs having "A" RNTI are present, the UEs receive the PDCCH and receive the PDSCH indicated by "B" and "C" through the information about the received PDCCH.

Figure 5:
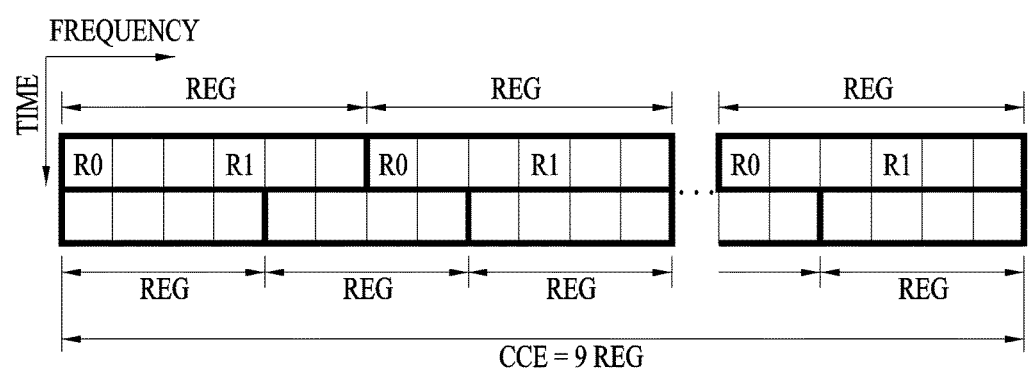
FIG. 5 is a diagram showing a resource unit used to configure a downlink control channel in an LTE system.
Figure 5:
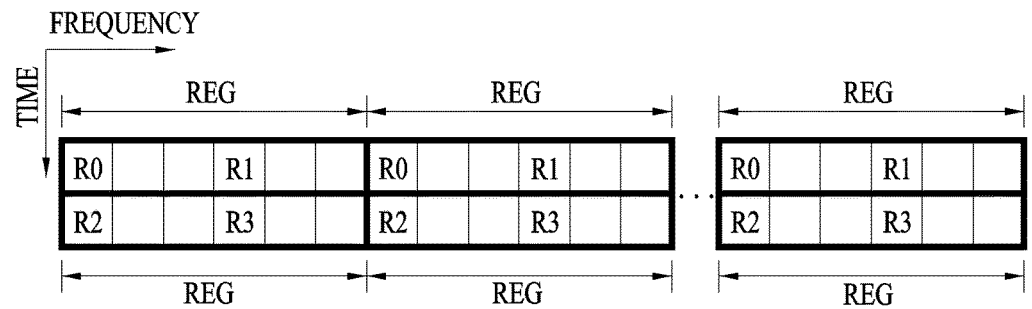

FIG. 5 is a diagram showing a resource unit used to configure a downlink control channel in an LTE system. In particular, FIG. 5(a) shows the case in which the number of transmit antennas of an eNB is 1 or 2 and FIG. 5(b) shows the case in which the number of transmit antennas of an eNB is 4. Only a reference signal (RS) pattern is changed according to the number of transmit antennas but a method for setting a resource unit related to a control channel is not changed.

Referring to FIG. 5, a basic resource unit of a downlink control channel is a resource element group (REG). The REG is composed of four neighboring resource elements (REs) in a state of excluding an RS. The REG is denoted by a thick line in the figure. A PCFICH and a PHICH include four REGs and three REGs, respectively. The PDCCH is configured in control channel element (CCE) units and one CCE includes nine REGs.

A UE is set to confirm $M^{(L)}(\geq L)$ CCEs which are arranged consecutively or according to a specific rule, in order to determine whether a PDCCH including L CCEs is transmitted to the UE. The UE may consider a plurality of L values, for PDCCH reception. A set of CCEs which should be confirmed by the UE for PDCCH reception is referred to as a search space. For example, an LTE system defines the search space as shown in Table 1.

TABLE 1

| Type | Search space $S_k^{(L)}$ Aggregation level L | Size [in CCEs] | Number of PDCCH candidates $M^{(L)}$ | DCI formats |
|---|---|---|---|---|
| UE-specific | 1 | 6 | 6 | 0, 1, 1A, 2B, 1D, 2, 2A, 2B, 4 |
|  | 2 | 12 | 6 |  |
|  | 4 | 8 | 2 |  |
|  | 8 | 16 | 2 |  |
| Common | 4 | 16 | 4 | 0, 1A, 1C, 3/3A |
|  | 8 | 16 | 2 |  |

A CCE aggregation level L denotes the number of CCEs configuring a PDCCH, $S_k^{(L)}$ denotes a search space of the CCE aggregation level L, and $M^{(L)}$ denotes the number of candidate PDCCHs which should be monitored in the search space of the aggregation level L.

The search space may be divided into a UE-specific search space in which only access of a specific UE is allowed and a common search space in which access of all UEs in a cell is allowed. A UE monitors common search spaces having CCE aggregation levels of 4 and 8 and monitors UE-specific search spaces having CCE aggregation levels of 1, 2, 4 and 8. The common search space and the UE-specific search space may overlap.

In a PDCCH search space applied to an arbitrary UE with respect to each CCE aggregation level value, the location of a first CCE (having a smallest index) is changed according to subframe. This is referred to as PDCCH search space hashing.

CCEs may be distributed in a system band. More specifically, a plurality of logically contiguous CCEs may be input to an interleaver and the interleaver serves to interleave the input CCEs in REG units. Accordingly, frequency/time resources configuring one CCE are physically scattered and distributed in the whole frequency/time region within a control region of a subframe. As a result, the control channel is configured in CCE units but interleaving is performed in REG units, thereby maximizing frequency diversity and interference randomization gain.

Figure 6:
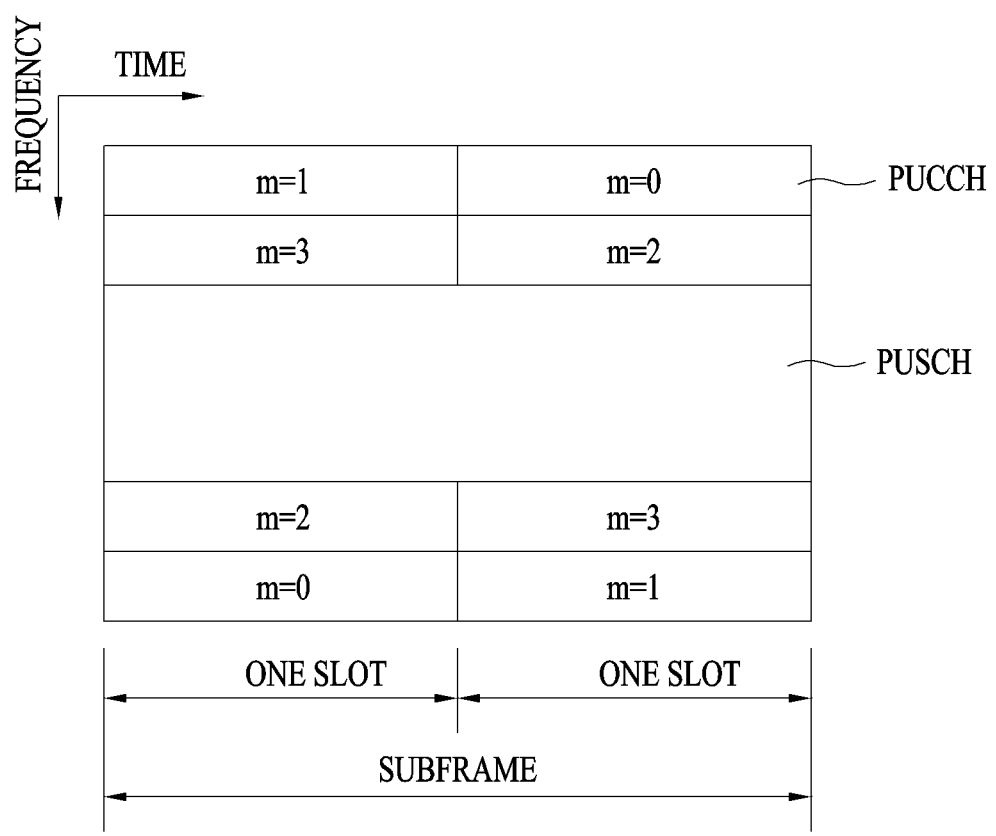
FIG. 6 is a diagram showing the structure of an uplink subframe used in an LTE system.

FIG. 6 is a diagram showing the structure of an uplink subframe used in an LTE system.

Referring to FIG. 6, an uplink subframe may be divided into a region to which a Physical Uplink Control Channel (PUCCH) carrying uplink control information is allocated and a region to which a Physical Uplink Shared Channel (PUSCH) carrying user data is allocated. A middle portion of the subframe is allocated to the PUSCH and both sides of a data region in the frequency domain are allocated to the PUCCH. Uplink control information transmitted on the PUCCH includes an ACK/NACK signal used for HARQ, a Channel Quality Indicator (CQI) indicating a downlink channel status, a rank indicator (RI) for MIMO, a scheduling request (SR) which is an uplink radio resource allocation request, etc. The PUCCH for one UE uses one resource block occupying different frequencies in slots within the subframe. That is, two resource blocks allocated to the PUCCH are frequency-hopped at a slot boundary. FIG. 6 shows the case in which a PUCCH having m=0, a PUCCH having m=1, a PUCCH having m=2, and a PUCCH having m=3 are allocated to the subframe.

In a current wireless communication environment, with emergence and dissemination of various devices requiring machine-to-machine (M2M) communication and high data transfer rate, data requirements of a cellular network are growing very quickly. To satisfy high data requirements, carrier aggregation technology for efficiently using a larger frequency band, multi antenna technology for increasing data capacity within a restricted frequency, multi base-station coordinated technology, etc. have been developed as communication technology and a communication environment is evolved to increase the density of nodes which can be accessed by users. Coordination between nodes may improve system performance of a system with a high density of nodes. In such a system, each node operates as an independent base station (BS), an advanced BS (ABS), a node B (NB), an eNodeB (eNB), an access point (AP), etc. and exhibits far superior performance to a non-coordinated system.

Figure 7:
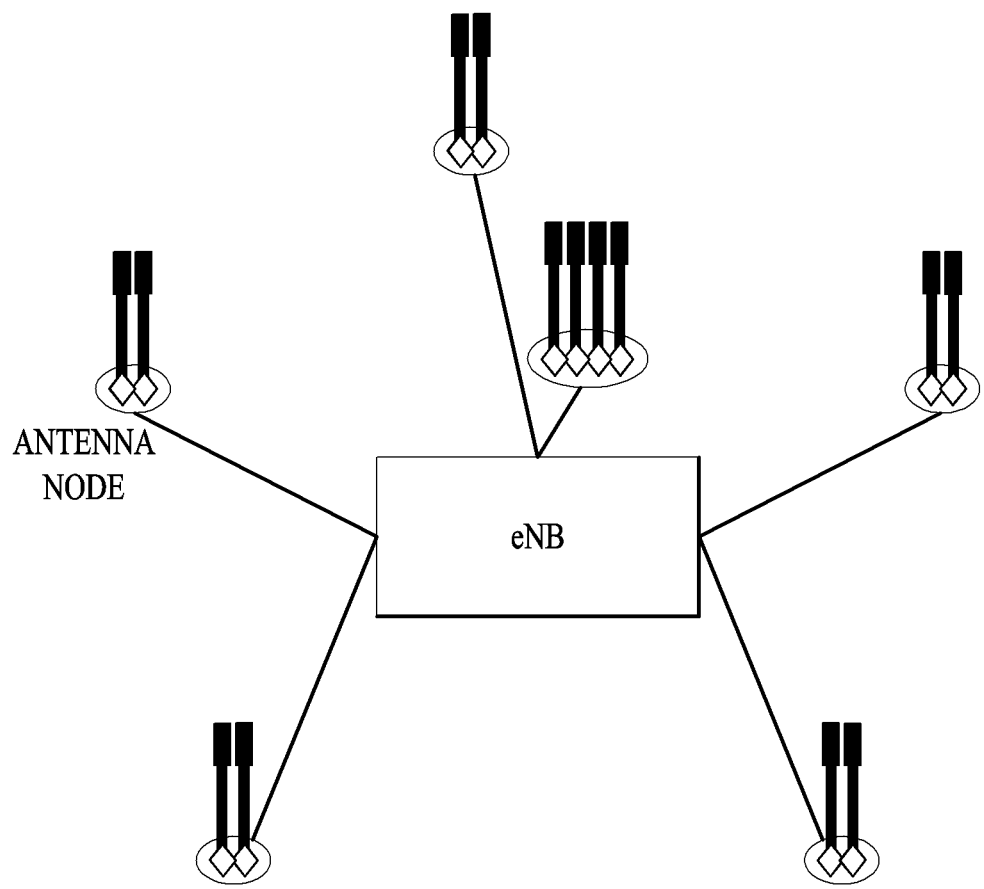
FIG. 7 is a diagram showing a multi-node system in a next-generation communication system.

FIG. 7 is a diagram showing a multi-node system in a next-generation communication system.

Referring to FIG. 7, if transmission and reception of all nodes are managed by one controller such that the individual nodes operate as parts of an antenna group of one cell, this system may be regarded as a distributed multi node system (DMNS) forming one cell. At this time, the individual nodes may be assigned separate node IDs or may operate as some antennas of a cell without a separate node ID. However, a system including nodes having different cell identifiers (IDs)

may be a multi cell system. If multiple cells are configured to overlap according to coverage, this is called a multi-tier network.

A NodeB, an eNodeB, a PeNB, a HeNB, a remote radio head (RRH), a relay, a distributed antenna, etc. may become a node and at least one antenna is mounted per node. The node is also called a transmission point. Although the node generally refers to a group of antennas separated by a predetermined distance or more, the present invention is applicable to an arbitrary group of nodes defined regardless of spacing.

Due to introduction of the above-described multi node system and relay node, various communication schemes are applicable to improve channel quality. However, in order to apply the MIMO scheme and an inter-cell communication scheme to a multi node environment, a new control channel is required. Accordingly, an enhanced-physical downlink control channel (EPDCCH) is being discussed as a newly introduced control channel and is allocated to a data region (hereinafter, referred to as a PDSCH region), not to an existing control region (hereinafter, referred to as a PDCCH region). In conclusion, control information of a node can be transmitted to each UE via such an EPDCCH so as to solve a problem that an existing PDCCH region is insufficient. For reference, the EPDCCH may not be transmitted to a legacy UE but may only be transmitted to an LTE-A UE. In addition, the EPDCCH is transmitted and received not based on a cell-specific reference signal (CRS) but based on a demodulation reference signal (DM-RS) which is a UE-specific reference signal.

number of OFDM symbols occupied by a PDCCH region and is transmitted on the same OFDM symbol. In particular, the PCFICH indicates the number of OFDM symbols occupied by the multiplexed PDCCH and a detailed codeword thereof is shown in Table 2 below. If a CFI value is n, the PDCCH is transmitted using first n OFDM symbols (that is, OFDM symbols #0 to #(n−1)) and a PDSCH is transmitted starting from a next OFDM symbol thereof (that is, OFDM symbol #n).

TABLE 2

| CFI | CFI code word $<b_0, b_1, \ldots, b_{31}>$ |
|---|---|
| 1 | <0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1> |
| 2 | <1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0> |
| 3 | <1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1> |
| 4 (Reserved) | <0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0> |

In addition, the possible CFI value may be changed according to downlink bandwidth expressed in RB units and subframe type. This example is shown in Table 3 below.

TABLE 3

| Subframe | Number of OFDM symbols for PDCCH when $N_{RB}^{DL} > 10$ | Number of OFDM symbols for PDCCH when $N_{RB}^{DL} \leq 10$ |
|---|---|---|
| Subframe 1 and 6 for frame structure type 2 | 1, 2 | 2 |
| MBSFN subframes on a carrier supporting PDSCH, configured with 1 or 2 cell-specific antenna ports | 1, 2 | 2 |
| MBSFN subframes on a carrier supporting PDSCH configured with 4 cell-specific antenna ports | 2 | 2 |
| Subframes on a carrier not supporting PDSCH | 0 | 0 |
| Non-MBSFN subframes (except subframe 6 for frame structure type 2) configured with positioning reference signals | 1, 2, 3 | 2, 3 |
| All other cases | 1, 2, 3 | 2, 3, 4 |

Figure 8:
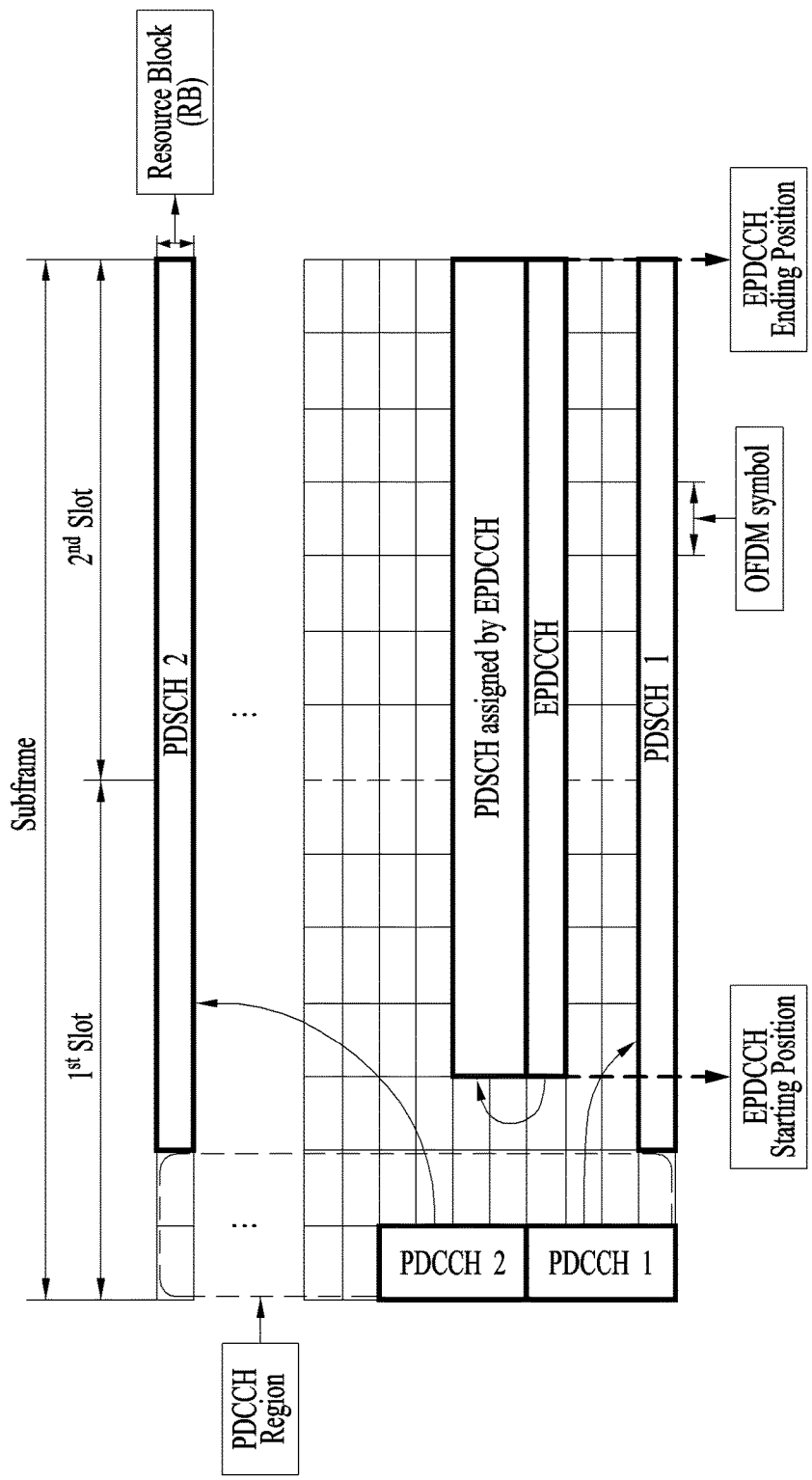
FIG. 8 is a diagram showing an EPDCCH and a PDSCH scheduled by the EPDCCH.

FIG. 8 is a diagram showing an EPDCCH and a PDSCH scheduled by the EPDCCH.

Referring to FIG. 8, PDCCH 1 and PDCCH 2 respectively schedule PDSCH 1 and PDSCH 2 and the EPDCCH schedules another PDSCH. In particular, in FIG. 8, the EPDCCH is transmitted on a fourth symbol to a last symbol of a subframe.

The EPDCCH may be generally transmitted via a PDSCH region for transmitting data. A UE should perform a blind decoding process of a search space for the EPDCCH in order to detect presence/absence of the EPDCCH thereof.

Hereinafter, for convenience of description, the EPDCCH is transmitted in a legacy PDSCH, that is, after a PDCCH is transmitted on a time axis, as shown in FIG. 8. Although the EPDCCH is transmitted using consecutive frequency resources in FIG. 8, this is only exemplary and the EPDCCH may be transmitted using nonconsecutive frequency resources for frequency diversity.

The legacy PDCCH is multiplexed with a PHICH indicating PUSCH retransmission and a PCFICH indicating the Since the EPDCCH is transmitted in the PDSCH region, a start point of the EPDCCH is preferably equal to that of the PDSCH. That is, the index of the start symbol of the EPDCCH is given via a PCFICH. In this state, the UE first decodes the PCFICH to detect an OFDM symbol occupied by the PDCCH based on a CFI value and then assumes that the EPDCCH is transmitted starting from a next OFDM symbol thereof. This method can efficiently multiplex the PDCCH and the EPDCCH in a subframe on which the PDCCH is transmitted.

However, in some subframes, the PDCCH may not be transmitted. For example, in a state in which a legacy UE using a PDCCH and an advanced-UE (A-UE) using an EPDCCH coexist in a specific eNB, traffic of the legacy UE may not occur and thus the PDCCH may not be used. In this case, the EPDCCH is transmitted starting from a first OFDM symbol, in order to further increase radio resource efficiency.

In the present invention, in a subframe in which a PDCCH is not transmitted, an EPDCCH is transmitted starting from a first OFDM symbol of the subframe.

For example, an eNB may notify a UE of whether a PDCCH is present using a reserved state value 4 among the CFI values of the PCFICH shown in Table 2. The UE, which has detected the CFI value of the reserved state, assumes that the EPDCCH is transmitted starting from the first OFDM symbol of the subframe. Since some REs may still be used for a PCFICH or a PHICH, the UE should assume that the EPDCCH is not mapped to the RE used for the PCFICH or the PHICH.

More specifically, since some REs or some REGs of a first OFDM symbol are already used to transmit the PCFICH including the CFI value of the reserved state, EPDCCH detection should be attempted on the assumption that the EPDCCH is not mapped to these REs.

In the PHICH, if specific REs are reserved for PHICH transmission, it may be assumed that the specific REs are not used for the EPDCCH. However, since the PHICH is not a channel which is necessarily transmitted unlike the PCFICH (in particular, an uplink subframe associated with the PHICH is not present on an uplink HARQ timeline or a PUSCH for detecting the PHICH may not be transmitted even if present), if the PCFICH includes the CFI value indicating the reserved state, it may be assumed that transmission resources of the PHICH are also used for the EPDCCH and the PDSCH scheduled by the EPDCCH.

Figure 9:
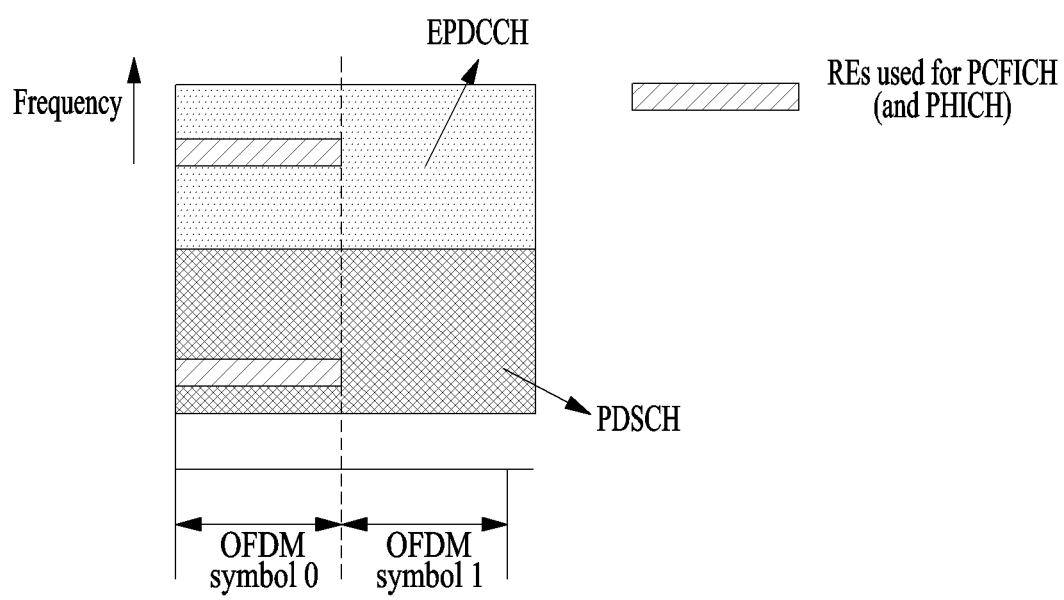
FIG. 9 is a diagram showing an example of mapping an EPDCCH according to an embodiment of the present invention.

FIG. 9 is a diagram showing an example of mapping an EPDCCH according to an embodiment of the present invention.

Referring to FIG. 9, even in a first OFDM symbol, an EPDCCH and a PDSCH scheduled by the EPDCCH are transmitted. All available REs excluding REs used by the PCFICH and the PHICH may be used for EPDCCH transmission. That is, the EPDCCH and the PDSCH scheduled by the EPDCCH coexist with the PCFICH and the PHICH to occupy different REs in the RB.

Although the PDSCH scheduled by the EPDCCH also performs the same operation as the EPDCCH in FIG. 9, the present invention is not limited thereto. For example, the PDSCH scheduled by the EPDCCH may be transmitted after a symbol where transmission of the PCFICH and the PHICH is terminated without multiplexing with the PCFICH and the PHICH on the same OFDM symbol, in order to maintain uniformity with the legacy PDSCH. For example, in FIG. 9, if the PCFICH includes a CFI value of a reserved state, the PDSCH scheduled by the EPDCCH may be transmitted starting from OFDM symbol #1.

Meanwhile, in order to simplify RE mapping of the EPDCCH and the PDSCH scheduled by the EPDCCH, the EPDCCH and the PDSCH scheduled by the EPDCCH may not be mapped to the RB including REs on which the PCFICH and the PHICH are transmitted.

Figure 10:
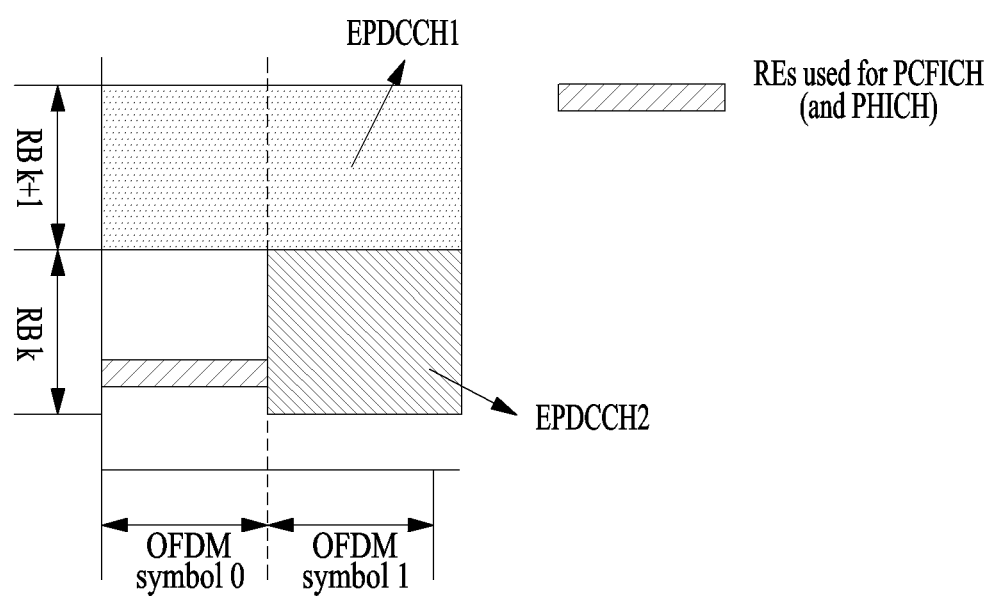
FIG. 10 is a diagram showing another example of mapping an EPDCCH according to an embodiment of the present invention.

FIG. 10 is a diagram showing another example of mapping an EPDCCH according to an embodiment of the present invention. In particular, in FIG. 10, assume that the PCFICH and the PHICH are transmitted on some REs of RB k and the PCFICH but the PHICH are not transmitted on RB k+1.

Referring to FIG. 10, EPDCCH 1 transmitted on RB k+1 uses OFDM symbol #0 and EPDCCH 2 using RB k is transmitted from OFDM symbol #1 to avoid multiplexing with the PCFICH and the PHICH on the same symbol, thereby simplifying an operation for detecting the EPDCCH at the UE.

When one EPDCCH and a PDSCH scheduled by the EPDCCH use a plurality of RBs, presence of the PCFICH and the PHICH on each RB may be changed.

Figure 11:
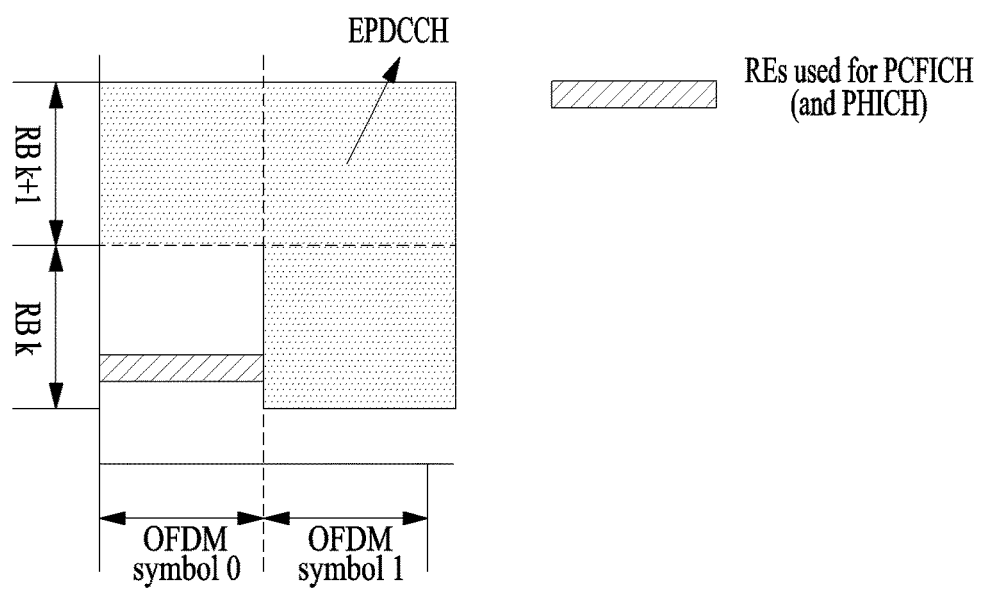
FIG. 11 is a diagram showing another example of mapping an EPDCCH according to an embodiment of the present invention.

FIG. 11 is a diagram showing another example of mapping an EPDCCH according to an embodiment of the present invention.

Referring to FIG. 11, when one EPDCCH and a PDSCH scheduled by the EPDCCH use a plurality of RBs, the EPDCCH and the PDSCH scheduled by the EPDCCH are not mapped to RBs in which a PCFICH and a PHICH are present but are mapped to RBs in which a PCFICH and a PHICH are not present. According to FIG. 11, it is possible to make better use of resources while avoiding multiplexing of the PCFICH and the EPDCCH/PDSCH on the same symbols of the same RB.

Figure 12:
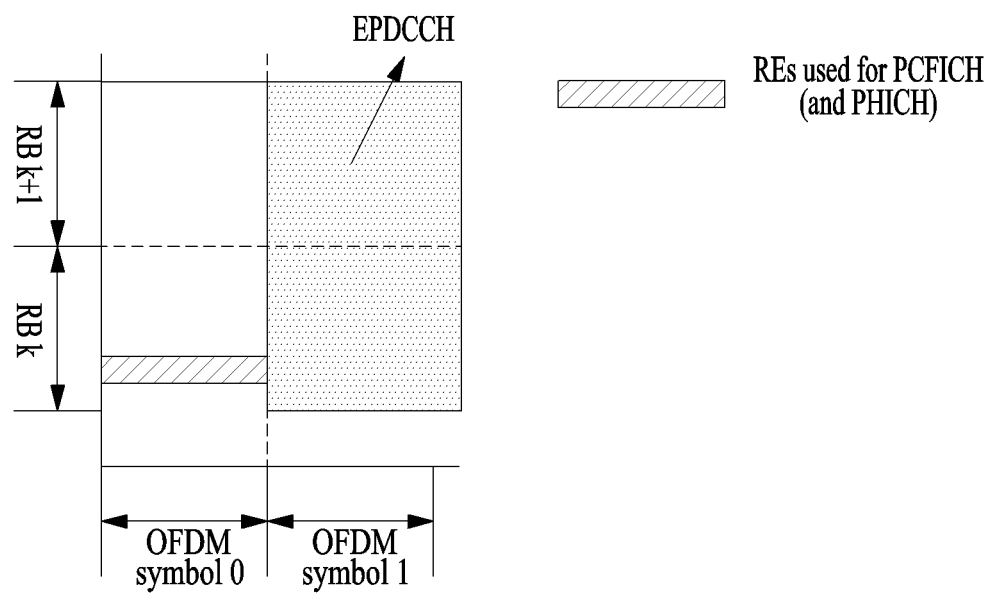
FIG. 12 is a diagram showing another example of mapping an EPDCCH according to an embodiment of the present invention.

FIG. 12 is a diagram showing another example of mapping an EPDCCH according to an embodiment of the present invention.

Referring to FIG. 12, if a specific EPDCCH and a PDSCH scheduled by the specific EPDCCH are multiplexed with a PCFICH and a PHICH on at least one RB, transmission of all RBs, to which the EPDCCH and the PDSCH scheduled by the EPDCCH are assigned, starts after transmission of the PCFICH and the PHICH is terminated. According to FIG. 12, resource waste slightly occurs but a transmission start point of the EPDCCH and the PDSCH scheduled by the EPDCCH is equally maintained on all RBs, thereby simplifying implementation. Even in FIG. 12, if a PCFICH and a PHICH are not transmitted on all RBs used by a specific EPDCCH and a PDSCH scheduled by the EPDCCH, transmission may start on a first OFDM symbol of the subframe.

The eNB may notify UE of a subframe which will use a PDCCH and a subframe which will not use a PDCCH in advance via a higher layer signal such as RRC signaling. The UE, which has received this information, detects the PCFICH to confirm a PDCCH region in a subframe in which the PDCCH is used and performs a reception operation on the assumption that the EPDCCH start to be transmitted in a subsequent PDSCH region thereof.

In contrast, in a subframe in which the PDCCH is not used, since the eNB does not need to transmit the PCFICH, the UE assumes that the EPDCCH and the PDSCH scheduled by the EPDCCH are transmitted starting from the first OFDM symbol of the symbol, on the assumption that the PCFICH is not present. At this time, resources reserved for transmission of the PCFICH and the PHICH are preferably used for transmission of the EPDCCH and the PDSCH scheduled by the EPDCCH. In this case, the eNB may transmit an additional higher layer signal and notify the UE whether a CRS which is a cell-specific RS is transmitted in a legacy PDCCH region. If the CRS is not transmitted, the UE assumes that the EPDCCH and the PDSCH scheduled by the EPDCCH are mapped to REs used by the CRS.

In addition, if the start position of the EPDCCH is not confirmed via the PCFICH, the eNB may notify the UE of the start position of the EPDCCH via a higher layer signal. In this case, the EPDCCH may be used after the first OFDM symbol of the subframe. Therefore, strong interference from the PDCCH of a neighboring cell can be avoided or a symbol occupied by the PDCCH of the neighboring cell is emptied out to reduce interference. Although the UE which performs such an operation may assume that the EPDCCH is mapped to symbols starting from the OFDM symbol indicated via a higher layer signal, in some cases, other signals such as the PCFICH, the PHICH or the PDCCH may be transmitted on that symbol. For example, if the PHICH is specified to be transmitted on OFDM symbols #0, #1 or #2, the start symbol of the EPDCCH may be OFDM symbol #0, #1 or #2. In this case, the UE may perform one of the following operations.

1) The UE may assume that other channels such as the PCFICH, the PHICH or the PDCCH are not transmitted on resources for receiving the EPDCCH thereof. For example, although specific REs are reserved for the PCFICH or the PHICH, the UE assumes that the specific REs are not used for the PCFICH or the PHICH but are used for the EPDCCH. The eNB may not transmit the PCFICH, the PHICH or the PDCCH on the specific REs.

2) Alternatively, the UE may assume that the EPDCCH is not transmitted on REs reserved for transmission of other channels such as the PCFICH or the PHICH or on an RB in which such REs are present. In this case, the UE may perform the operation shown in FIGS. 9 to 12.

Further, operations 1) and 2) may be combined. For example, operation 2) is performed with respect to a specific channel such as the PCFICH received by all UEs and operation 1) is performed with respect to other channels such as the PHICH received by an individual UE.

Of course, it is possible to prevent such a problem via an appropriate setting process of an eNB. That is, if the PHICH is transmitted on OFDM symbols #0, #1 or #2, the start symbol of the EPDCCH is not set to OFDM symbol #1 or #2. In this case, the EPDCCH is always set to be transmitted starting from symbol #3 or a symbol subsequent thereto. If the eNB always guarantees such an operation and the start symbol of the EPDCCH is indicated via a higher layer signal, the UE may transmit the EPDCCH, on the assumption that other channels such as the PCFICH, the PDCCH and the PHICH are not present on the start symbol and a subsequent symbol.

The eNB may specify a plurality of EPDCCH sets with respect to a single UE depending on situations. Here, the EPDCCH set means a set of physical resource blocks (PRBs) in which a series of EPDCCH candidates is present, and a PRB configuring each EPDCCH set may be indicated from a higher layer signal. The UE assumes that each EPDCCH candidate uses resources of an EPDCCH set, to which the EPDCCH candidate belongs, when attempting to detect specific EPDCCH candidates. Additionally, the eNB may set unique features per EPDCCH set. For example, whether the EPDCCH candidate uses localized transmission or distributed transmission may be set or a parameter for a HARQ operation when a candidate belonging to each EPDCCH set is used as downlink grant may be set.

In the present invention, if a plurality of EPDCCH sets is set, a start symbol is set per EPDCCH set. In particular, the operation for setting the start symbol per EPDCCH set is efficient when cells which respectively transmit EPDCCH sets are different.

For example, assume that EPDCCH set 1 and EPDCCH set 2 are present and are respectively transmitted by cell 1 and cell 2. In this case, cell 1 delays the start symbol of the EPDCCH in order to protect the PDCCH of neighboring cell 3, whereas cell 2 transmits the EPDCCH starting from a first symbol because the PDCCH of the neighboring cell does not need to be protected.

Here, differently setting the start symbol per EPDCCH set includes differently setting the above-described features, such as whether the transmission time of the EPDCCH is confirmed via the PCFICH or a higher layer signal, per EPDCCH set. That is, with respect to EPDCCH set 1, in order to prevent interference of the PCFICH of cell 1 from having influence on cell 3, the start symbol of the EPDCCH is confirmed via a higher layer signal. However, with respect to EPDCCH set 2 without interference, the start symbol of the EPDCCH is determined via the PCFICH.

Additionally, if a carrier aggregation (CA) scheme is applied and a PDSCH of a component carrier is scheduled to the UE via a specific EPDCCH, it is preferably assumed that the PDSCH starts to be transmitted at the same time as the EPDCCH. In other words, if the transmission time of the EPDCCH is confirmed via the PCFICH and downlink grant is received via the EPDCCH, the start point of the PDSCH is also determined via the PCFICH and, if the transmission time of the EPDCCH is confirmed via the higher layer signal and downlink grant is received via the EPDCCH, the start point of the PDSCH is also indicated by the higher layer signal.

Transmission of a control channel (e.g., a PCFICH, a PHICH, a PDCCH, etc.) having a resource mapping scheme different from that of an EPDCCH and a PDSCH scheduled by the EPDCCH is restrictively applicable depending on from which transmission point the EPDCCH or the PDSCH scheduled by the EPDCCH is transmitted. Hereinafter, this will be described in detail.

In a coordinated multiple point (CoMP) situation in which one UE receives a downlink channel from a plurality of transmission points, the UE may receive a specific EPDCCH or a PDSCH scheduled by the EPDCCH from a specific transmission point via specific time resources and/or specific frequency resources or receive an EPDCCH or a PDSCH scheduled by the EPDCCH from another transmission point via other time resources and/or other frequency resources. At this time, if the UE can determine from which transmission point the channel is transmitted, channel reception performance can be improved using several attributes observed from the transmission point, e.g., large scale properties such as Doppler spread, Doppler shift, average delay, delay spread or average gain.

The eNB may signal the transmission point, from which a specific EPDCCH or a PDSCH scheduled by the specific EPDCCH are transmitted. As an example, the eNB may notify the UE that a specific EPDCCH or a PDSCH scheduled by the specific EPDCCH are quasi co-located (QCL) with a specific reference signal such as a CRS or a CSI-RS consistently transmitted by a specific transmission point. Here, QCL may mean that the channel has the same channel attributes as the specific reference signal in the long term. If information about QCL is not provided, the UE may assume that all channels are transmitted from a serving cell and are QCL with the CRS of the serving cell.

Accordingly, resource mapping of a specific EPDCCH or a PDSCH scheduled by the specific EPDCCH and transmission of other control channels such as a PCFICH, a PHICH and a PDCCH are selectively applicable depending on with which RS the channel is QCL.

That is, since the PCFICH, the PHICH and the PDCCH are demodulated based on the CRS of the serving cell, if a specific EPDCCH or a PDSCH scheduled by the specific EPDCCH is transmitted from the serving cell, on the assumption that the PCFICH, the PHICH and the PDCH cannot be simultaneously transmitted via the same resources as the EPDCCH or the PDSCH, resource mapping of the specific EPDCCH or the PDSCH scheduled by the specific EPDCCH and transmission of other control channels such as the PCFICH, the PHICH and the PDCCH are preferably performed according to the present invention.

However, if the specific EPDCCH or the PDSCH scheduled by the specific EPDCCH are transmitted from a transmission point other than the serving cell, even when the specific EPDCCH or the PDSCH scheduled by the specific EPDCCH collides with resources for other control channels of the serving cell, transmission may be possible and, if mutual interference is not strong, both the specific EPDCCH and the PDSCH may be received. Accordingly, if the specific EPDCCH or the PDSCH scheduled by the specific EPDCCH are transmitted from the transmission point other than the serving cell, reception may be performed on the assumption that the specific EPDCCH and the PDSCH scheduled by the specific EPDCCH are mapped to all possible resources starting from a predetermined start time and, at the same time, the other control channels such as the PCFICH, the PHICH and the PDCCH are transmitted from the serving cell.

At this time, the UE should determine when the specific EPDCCH or the PDSCH scheduled by the specific EPDCCH are transmitted from the transmission point other than the serving cell. For example, if the eNB notifies the UE that the specific EPDCCH or the PDSCH scheduled by the EPDCCH are QCL with an RS other than the CRS of the serving cell, the UE may assume that the EPDCCH/PDSCH is transmitted from the transmission point other than the serving cell at that time.

As another example, even when information about QCL is not specially provided, it is assumed that there is a default CSI-RS assuming that a predetermined channel is QCL. In this case, if a specific EPDCCH/PDSCH is QCL with such a default CSI-RS, it is assumed that the specific EPDCCH/PDSCH is transmitted from the serving cell and, if specific EPDCCH/PDSCH is QCL with another CSI-RS, it is assumed that the specific EPDCCH/PDSCH is transmitted from the transmission point other than the serving cell.

As another example, the eNB may signal information indicating whether each PDSCH/EPDCCH is transmitted from the serving cell via a higher layer signal or a physical layer signal. Alternatively, the eNB may signal information indicating whether each PDSCH/EPDCCH is QCL with the CRS of the serving call via a higher layer signal or a physical layer signal. If the PDSCH/EPDCCH is not QCL with the CRS of the serving cell, it is assumed that the PDSCH/EPDCCH is transmitted from the transmission point other than the serving cell without special signaling.

If the specific EPDCCH or the PDSCH scheduled by the specific EPDCCH are transmitted from the serving cell, the start symbol may precede the transmission time of the EPDCCH/PDSCH confirmed by the UE via the PCFICH. For example, in a state in which the UE has received the specific PDSCH and has been informed that the PDSCH is transmitted from the serving cell, the start time of the PDSCH may be set to earlier than the transmissible time confirmed via the PCFICH. In particular, such a situation may occur when the start time of the PDSCH is specified by DCI delivered via the EPDCCH.

If the start time of the PDSCH delivered from the eNB is present before the termination time of the PDCCH region confirmed via the PCFICH, there is a need for a method for solving a problem that the PDSCH and the PDCCH overlap each other in terms of time. For example, since the UE has already accordingly received the PCFICH, priority may be assigned to the PCFICH such that the PDSCH is mapped to the start time of the PDSCH specified by the PCFICH. Even in this case, if the transmission time of the PDSCH specified by the DCI in the EPDCCH is later than the start time of the PDSCH specified by the PCFICH, priority may be assigned to DCI. That is, at this time, for preventing PDCCH interference with a neighboring cell, the PDSCH may be assumed to be transmitted starting from a time specified by DCI. Alternatively, priority may be always assigned to the PCFICH such that the PDSCH is regarded as being mapped to symbols starting from a time specified by the PCFICH.

Additionally, if conflicting information coexists, errors may be regarded as occurring in the PDCCH or the PCFICH and the PDSCH may be ignored and data may be prevented from being stored in a buffer for HARQ. For example, if the start time of the PDSCH delivered from the DCI in the EPDCCH is present before the termination time of the PDCCH region confirmed via the PCFICH, the UE regards the detected DCI as error based on the fact that the PDSCH and the PDCCH cannot be simultaneously transmitted from the same serving cell.

Figure 13:
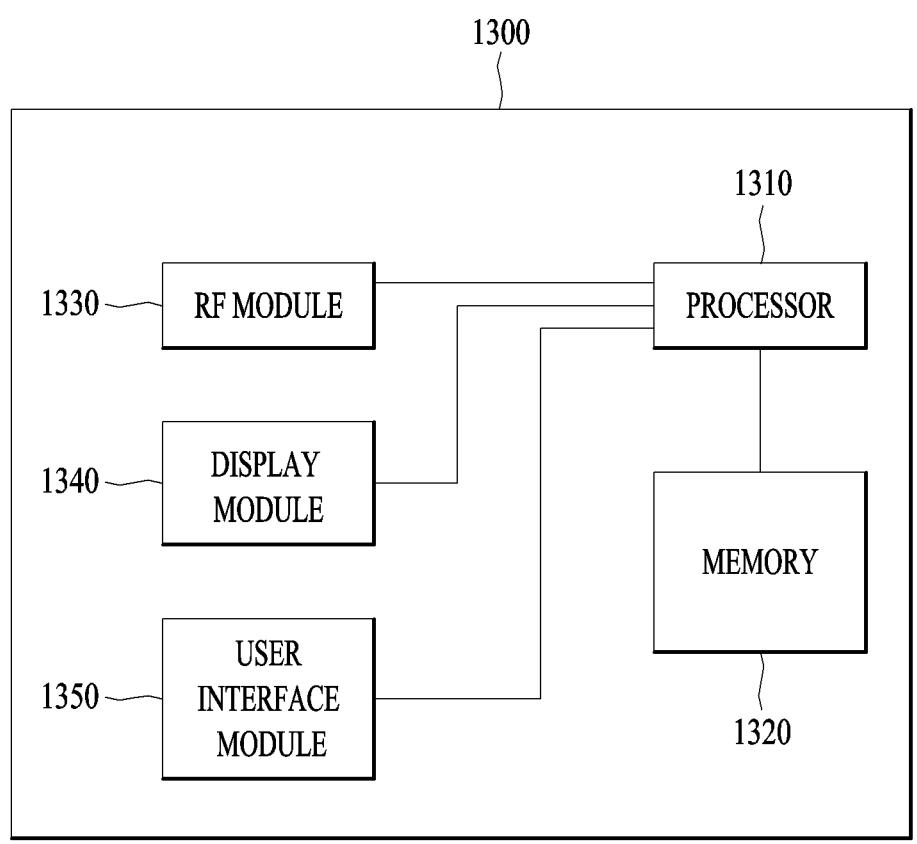
FIG. 13 is a block diagram of a communication apparatus according to one embodiment of the present invention.

FIG. 13 is a block diagram of a communication apparatus according to one embodiment of the present invention.

Referring to FIG. 13, a communication apparatus 1300 includes a processor 1310, a memory 1320, a Radio Frequency (RF) module 1330, a display module 1340 and a user interface module 1350.

The communication apparatus 1300 is shown for convenience of description and some modules thereof may be omitted. In addition, the communication apparatus 1300 may further include necessary modules. In addition, some modules of the communication apparatus 1300 may be subdivided. The processor 1310 is configured to perform an operation of the embodiment of the present invention described with reference to the drawings. For a detailed description of the operation of the processor 1310, reference may be made to the description associated with FIGS. 1 to 12.

The memory 1320 is connected to the processor 1310 so as to store an operating system, an application, program code, data and the like. The RF module 1330 is connected to the processor 1310 so as to perform a function for converting a baseband signal into a radio signal or converting a radio signal into a baseband signal. The RF module 1330 performs analog conversion, amplification, filtering and frequency up-conversion or inverse processes thereof. The display module 1340 is connected to the processor 1310 so as to display a variety of information. As the display module 1340, although not limited thereto, a well-known device such as a Liquid Crystal Display (LCD), a Light Emitting Diode (LED), or an Organic Light Emitting Diode (OLED) may be used. The user interface module 1350 is connected to the processor 1310 and may be configured by a combination of well-known user interfaces such as a keypad and a touch screen.

The above-described embodiments are proposed by combining constituent components and characteristics of the present invention according to a predetermined format. The individual constituent components or characteristics should be considered optional on the condition that there is no additional remark. If required, the individual constituent components or characteristics may not be combined with other components or characteristics. In addition, some constituent components and/or characteristics may be combined to implement the embodiments of the present invention. The order of operations disclosed in the embodiments of the present invention may be changed. Some components or characteristics of any embodiment may also be included in other embodiments, or may be replaced with those of the other embodiments as necessary. Moreover, it will be apparent that some claims referring to specific claims may be combined with other claims referring to the other claims other than the specific claims to constitute the embodiment or add new claims by means of amendment after the application is filed.

The embodiments of the present invention can be implemented by a variety of means, for example, hardware, firmware, software, or a combination thereof. In the case of implementing the present invention by hardware, the present invention can be implemented through application specific integrated circuits (ASICs), digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software code may be stored in a memory unit so as to be driven by a processor. The memory unit may be located inside or outside of the processor, so that it can communicate with the aforementioned processor via a variety of well-known parts.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

Although an example in which a method for setting a start symbol of a downlink channel in a wireless communication system and an apparatus for the same are applied to a 3GPP LTE system is described, the present invention is applicable to various wireless communication systems in addition to the 3GPP LTE system.

The invention claimed is:

1. A method for receiving a downlink signal on a predetermined subframe at a user equipment (UE) in a wireless communication system, the method comprising:
   receiving an enhanced physical downlink control channel (EPDCCH) from a base station; and
   receiving a physical downlink shared channel (PDSCH) from the base station based on the EPDCCH,
   wherein, if a physical control format indicator channel (PCFICH) indicating a control region for mapping a physical downlink control channel (PDCCH) is received on the predetermined subframe and if the PDCCH is not received on the predetermined subframe, the UE determines that the EPDCCH is mapped from an initial symbol of the predetermined subframe within the control region except for a plurality of resource elements (REs) for receiving the PCFICH.

2. The method according to claim 1, further comprising receiving information about the predetermined subframe via a higher layer.

3. The method according to claim 2, further comprising receiving, via the higher layer, information about whether a cell-specific reference signal for the predetermined subframe is transmitted from the base station.

4. The method according to claim 1, wherein the EPDCCH includes information about a start symbol of the PDSCH.

5. The method according to claim 4, wherein, if the start symbol of the PDSCH indicated by the EPDCCH and the start symbol of the PDSCH indicated by the PCFICH are different, the UE determines that the PDSCH is received starting from the start symbol of the PDSCH indicated by the EPDCCH.

6. The method according to claim 4, wherein, if the start symbol of the PDSCH indicated by the EPDCCH and the start symbol of the PDSCH indicated by the PCFICH are different, the UE determines that the PDSCH is received starting from the start symbol of the PDSCH indicated by the PCFICH.

7. The method according to claim 4, wherein, if the start symbol of the PDSCH indicated by the EPDCCH and the start symbol of the PDSCH indicated by the PCFICH are different, the PDSCH is deleted from a buffer.

8. A user equipment (UE) apparatus in a wireless communication system, the UE apparatus comprising:
   a transceiver configured to transmit and receive a signal to and from a base station; and
   a processor configured to process the signal,
   wherein the transceiver receives an enhanced physical downlink control channel (EPDCCH) and a physical downlink shared channel (PDSCH) scheduled by the EPDCCH on a predetermined subframe from the base station, and
   wherein, if a physical control format indicator channel (PCFICH) indicating a control region for mapping a physical downlink control channel (PDCCH) is received on the predetermined subframe and if the PDCCH is not received on the predetermined subframe, the processor determines that the EPDCCH is mapped from an initial symbol of the predetermined subframe within the control region except for a plurality of resource elements (REs) for receiving the PCFICH.

9. The UE apparatus according to claim 8, wherein:
the EPDCCH includes information about a start symbol of the PDSCH, and
if the symbol of the PDSCH indicated by the EPDCCH and the start symbol of the PDSCH indicated by the PCFICH are different, the processor determines that the PDSCH is received starting from the start symbol of the PDSCH indicated by the EPDCCH.

10. The UE apparatus according to claim 8, wherein:
the EPDCCH includes information about a start symbol of the PDSCH, and
if the symbol of the PDSCH indicated by the EPDCCH and the start symbol of the PDSCH indicated by the PCFICH are different, the processor determines that the PDSCH is received starting from the start symbol of the PDSCH indicated by the PCFICH.

11. The UE apparatus according to claim 8, wherein:
the EPDCCH includes information about a start symbol of the PDSCH, and
if the start symbol of the PDSCH indicated by the EPDCCH and the start symbol of the PDSCH indicated by the PCFICH are different, the PDSCH is deleted from a buffer.

* * * * *